US011800578B2

(12) United States Patent
Mantha et al.

(10) Patent No.: US 11,800,578 B2
(45) Date of Patent: Oct. 24, 2023

(54) TECHNIQUES FOR HANDLING TUNNEL ERRORS FOR MULTI-TUNNEL SESSIONS

(71) Applicant: Cisco Technology, Inc., San Jose, CA (US)

(72) Inventors: Ravi Sankar Mantha, Karnataka (IN); Sandeep Dasgupta, Bangalore (IN); Sateesh Reddy Mommidi, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 176 days.

(21) Appl. No.: 17/512,851

(22) Filed: Oct. 28, 2021

(65) Prior Publication Data
US 2023/0134856 A1    May 4, 2023

(51) Int. Cl.
*H04W 76/12* (2018.01)
*H04W 76/15* (2018.01)
*H04W 28/12* (2009.01)

(52) U.S. Cl.
CPC ........... *H04W 76/12* (2018.02); *H04W 28/12* (2013.01); *H04W 76/15* (2018.02)

(58) Field of Classification Search
CPC ..... H04W 76/11; H04W 76/12; H04W 76/15; H04W 76/19; H04W 76/22; H04W 28/12; H04W 28/0268
See application file for complete search history.

(56) References Cited

U.S. PATENT DOCUMENTS

| 2014/0064246 | A1* | 3/2014 | Baillargeon | ........ H04L 61/2592 370/329 |
| 2014/0341047 | A1* | 11/2014 | Sadeh | ................... H04W 76/11 370/252 |
| 2017/0303145 | A1* | 10/2017 | Yang | ..................... H04W 76/22 |
| 2020/0015142 | A1* | 1/2020 | Jia | .......................... H04W 76/15 |
| 2020/0053815 | A1 | 2/2020 | Teyeb et al. | |
| 2020/0107213 | A1 | 4/2020 | Park et al. | |
| 2020/0260325 | A1 | 8/2020 | Futaki et al. | |

(Continued)

OTHER PUBLICATIONS

Samsung; "GTP error Indication in DC"; Agenda item: 20; 3GPP TSG RAN WG3 #85 Dresden, Germany, Aug. 18-22, 2014; R3-141767 (Year: 2014).*

(Continued)

*Primary Examiner* — Gary Mui
(74) *Attorney, Agent, or Firm* — Edell, Shapiro & Finnan, LLC

(57) ABSTRACT

Presented herein is a method that may include obtaining, by a session management node associated with a data session of a user equipment, an indication that an error has occurred at an endpoint of a first tunnel of the data session for the user equipment, the data session having a plurality of flows associated with the first tunnel and a second tunnel; transmitting, to an access and mobility management function (AMF), a request to modify resources for a first plurality of flows associated with the first tunnel; obtaining, from the AMF, a response including an indication of a new tunnel assigned to the first plurality of flows; and transmitting a request to a user plane function (UPF) including an identifier associated with the new tunnel for the first plurality of flows to facilitate transmitting data associated with the first plurality of flows over the new tunnel.

20 Claims, 9 Drawing Sheets

(56) References Cited

U.S. PATENT DOCUMENTS

2020/0404732 A1 12/2020 Shi et al.
2021/0153070 A1 5/2021 Velev et al.

OTHER PUBLICATIONS

Huawei; "GTP-U Error Indication from SeNB"; Agenda item: 20.1.6; 3GPP TSG RAN WG3 Meeting #85bis Shanghai, P. R. China, Oct. 6-10, 2014 R3-142195 (Year: 2014).*
NEC ; "Handling of error ocassion in GTP-U for dual connectivity"; Agenda: 20.1.6 3GPP TSG-RAN WG3#85bis Shanghai, China, Oct. 6-10, 2014; R3-142349 (Year: 2014).*
Ericsson' "Handling of GTP-U Error Indication for Dual Connectivity"; Agenda Item: 20.1.6 3GPP TSG-RAN WG3 Meeting #85bis Shanghai, P. R. China, Oct. 6-10, 2014; R3-142454 (Year: 2014).*
3GPP TS 23.007 V17.2.0 (Sep. 2021) 3rd Generation Partnership Project; Technical Specification Group Core Network and Terminals; Restoration procedures; (Release 17) (Year: 2021).*
3GPP TS 23.502 V17.2.0 (Sep. 2021) 3rd Generation Partnership Project; Technical Specification Group Services and System Aspects; Procedures for the 5G System (5GS); Stage 2 (Release 17) (Year: 2021).*
3GPP TS 29.281 V17.1.0 (Sep. 2021) 3rd Generation Partnership Project; Technical Specification Group Core Network and Terminals; General Packet Radio System (GPRS) Tunnelling Protocol User Plane (GTPv1-U) (Release 17) (Year: 2021).*
3GPP, "LTE; 5G; Interface between the Control Plane and the User Plane nodes," 3GPP TS 29.244 Version 16.6.0 Release 16, Technical Specification, Jan. 2021, 322 pages.
3GPP, "5G; 5G System; Restoration procedures," 3GPP TS 23.527 version 15.2.0 Release 15, Technical Specification, Apr. 2019, 22 pages.
"3rd Generation Partnership Project; Technical Specification Group Services and System Aspects; System architecture for the 5G System (5GS); Stage 2 (Release 17)," 3GPP, TS 23.501 V17.2.0, Sep. 2021, 542 pages.

* cited by examiner

| Redundant Transmission Forwarding Parameters IE | | |
|---|---|---|
| Octet 1 and 2 | Redundant Transmission Forwarding Parameters IE | |
| Octets 3 and 4 | Length = n | |
| Information Elements | Condition / Comment | IE Type |
| Outer Header Creation | This IE shall be present if the UP function is required to perform the redundant transmission of the outgoing packet. If present, it shall contain the F-TEID of the remote GTP-U peer for redundant transmission. | Outer Header Creation |
| Network Instance for Redundant Transmission | This IE shall be included if the GTP-U tunnel used for redundant transmission uses a different network instance than the Network Instance used for the primary GTP-U tunnel. | Network Instance |

FIG. 4

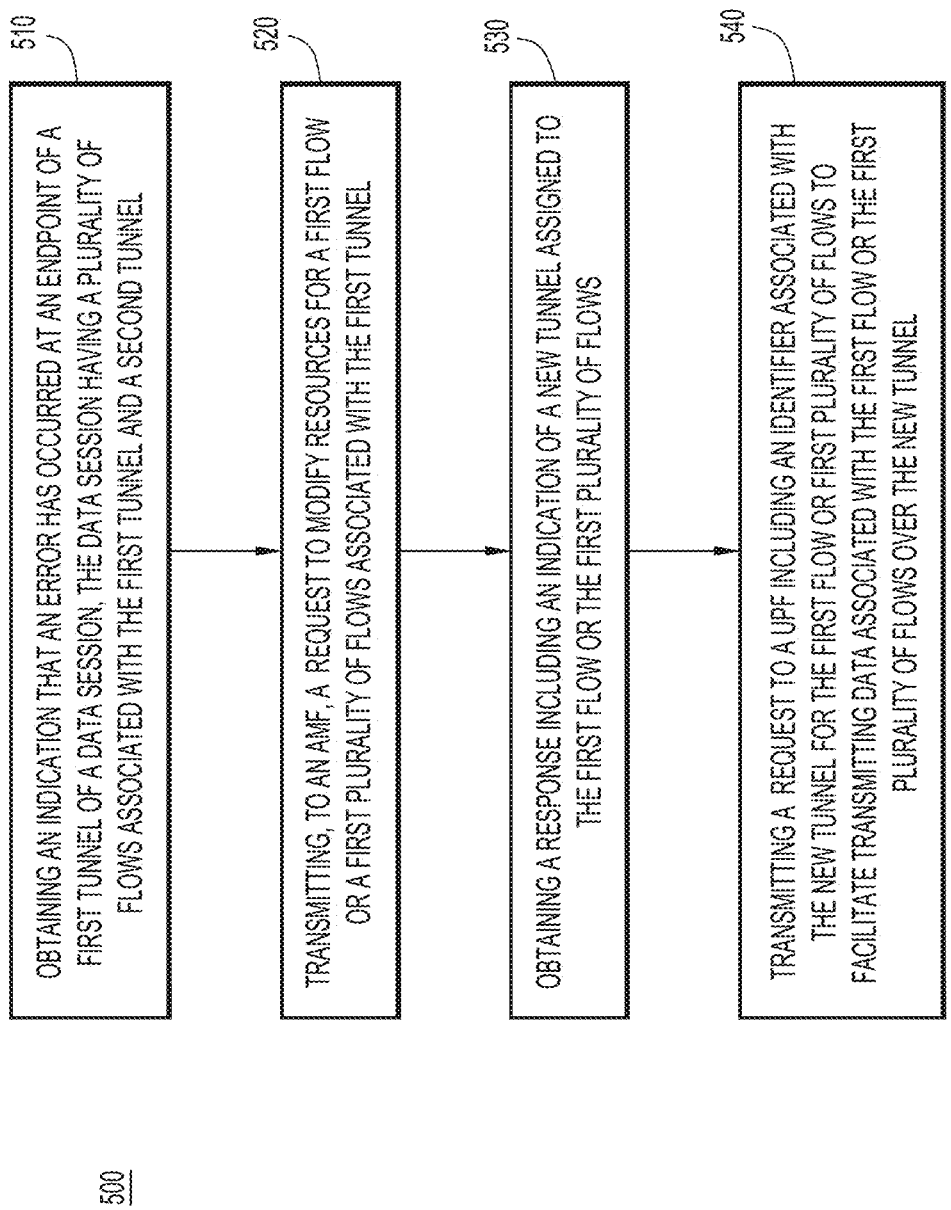

TECHNIQUES FOR HANDLING TUNNEL ERRORS FOR MULTI-TUNNEL SESSIONS

TECHNICAL FIELD

The present disclosure relates to network equipment and services.

BACKGROUND

Networking architectures have grown increasingly complex in communications environments, particularly mobile networking environments. Mobile communication networks have grown substantially as end users become increasingly connected to mobile network environments. There are significant challenges in recovering from network node failures without disruption to communication sessions.

BRIEF DESCRIPTION OF THE DRAWINGS

FIG. 4 is a diagram illustrating a Redundant Transmission Forwarding Parameters information element, according to an example embodiment.

FIG. 5 is a flow chart depicting a method of handling GTP-u errors for sessions involving multiple downlink tunnels, according to an example embodiment.

DESCRIPTION OF EXAMPLE EMBODIMENTS

Overview

Figure 1:
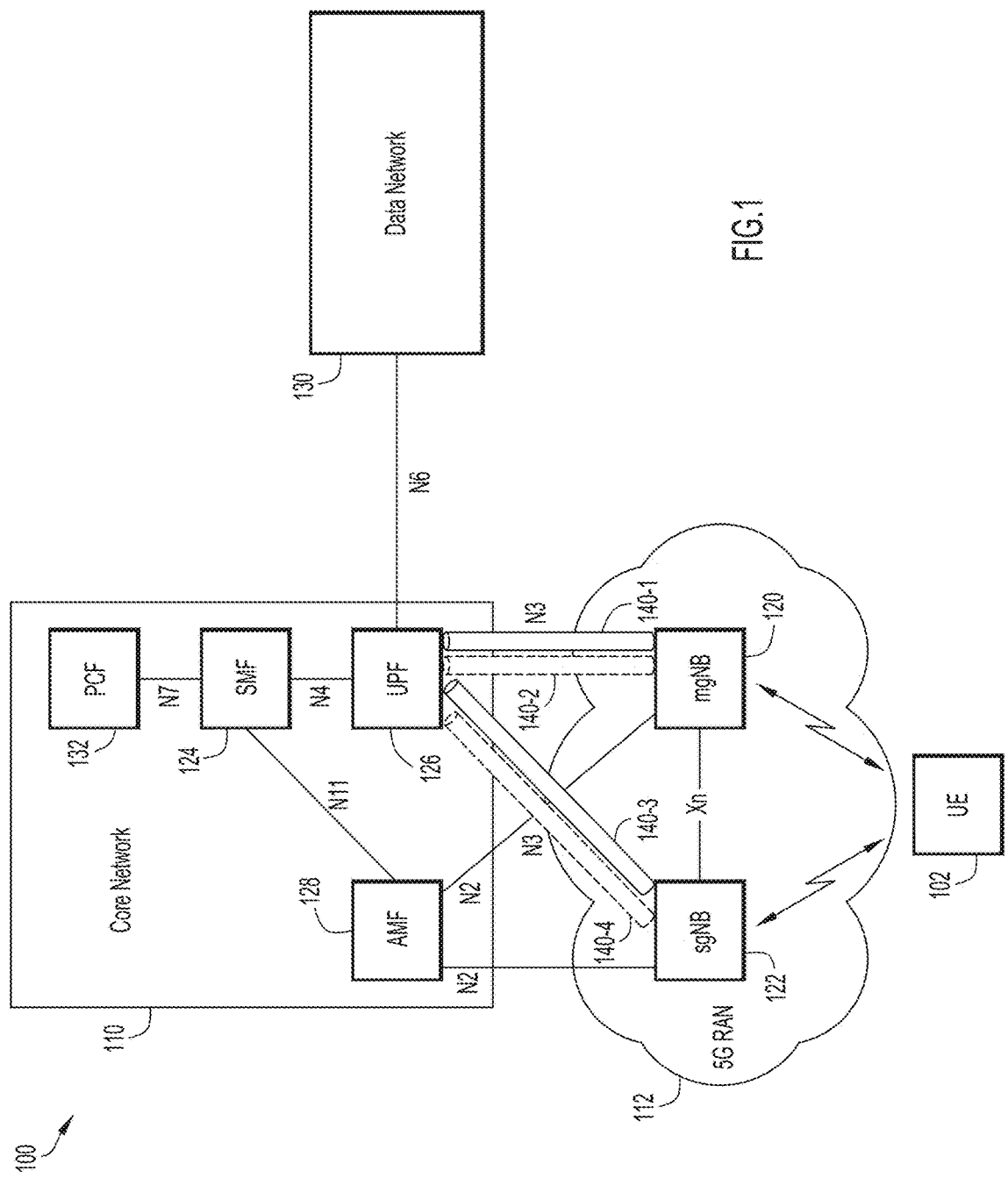
FIG. 1 is a block diagram of a system in which techniques that may facilitate handling General Packet Radio Service (GPRS) Tunneling Protocol user-plane (GTP-u) errors for sessions involving multiple downlink tunnels may be implemented, according to an example embodiment.

In Fifth (5$^{th}$) Generation (5G) networks, ultra-reliable low latency communications (URLLC) sessions utilize redundant data transmission to ensure reliable data transmission. Third Generation Partnership Project (3GPP) standards define mechanisms to support redundant and independent N3 tunnels for specific quality of service (QoS) flows of a URLLC session.

In the case of New Radio-Dual Connectivity (NR-DC) sessions, a master gNodeB (gNB) may steer select QoS flows via one or more secondary gNBs. In this scenario, a NR-DC Protocol Data Unit (PDU) session may have two downlink (DL) tunnel endpoints—one endpoint at the master gNB and one endpoint at the secondary gNB.

For both the URLLC and the NR-DC sessions, one of the downlink tunnel endpoints may fail (e.g., due to secondary gNB loss of context or other failures, due to air interface errors, etc.). When one downlink tunnel endpoint fails, a General Packet Radio Service (GPRS) Tunneling Protocol user-plane (GTP-u) path failure or error indication on the N3 interface may occur, which can affect all the data paths for an entire session when only partial flows of the session may be impacted.

Currently, there are no efficient standards-based mechanisms for recovering from GTP-u errors. Techniques herein provide an efficient mechanism to recover from GTP-u errors that reduces signaling during GTP-u error recovery compared to existing mechanisms to handle GTP-u errors and does not impact the data path for healthy QoS flows of a session that involves multiple flows over multiple tunnels. Techniques described herein allow for maintaining QoS flows over tunnels not affected by the error indication. Techniques described herein further allow for transmitting QoS flows associated with a failed tunnel over a new tunnel so traffic may continue to flow with minimal disruption.

In one embodiment, a method is performed, which may include obtaining, by a session management node associated with a data session of a user equipment, an indication that an error has occurred at an endpoint of a first tunnel of the data session for the user equipment, the data session having a plurality of flows associated with the first tunnel and a second tunnel; transmitting, to an access and mobility management function (AMF), a request to modify resources for a first plurality of flows associated with the first tunnel; obtaining, from the AMF, a response including an indication of a new tunnel assigned to the first plurality of flows; and transmitting a request to a user plane function (UPF) including an identifier associated with the new tunnel for the first plurality of flows to facilitate transmitting data associated with the first plurality of flows over the new tunnel, wherein the second tunnel is maintained so that data of flows associated with the second tunnel are transmitted over the second tunnel.

Example Embodiments

Third Generation Partnership Program (3GPP) Technical Specification (TS) 23.527, at section 5.3.2, has defined restoration procedures that may take place when a GTP-u error indication is received at a User Plane Function (UPF) from an access network. The defined standards-based procedure provides that, when a GTU-u error indication is received at the UPF, a session management function (SMF) via an Access and Mobility Management Function (AMF) performs an N2 session resource release towards the access network by triggering the AMF to an N2 PDU Session Resource Release Command to the access network, which will put all QoS flows in the session (i.e., QoS flows that are affected by the error and also QoS flows that are not affected by the error) in an idle mode. In addition, per the defined standards-based procedure, the SMF performs a network triggered service request to reestablish the data path with the access network.

The defined standards-based approach has a number of drawbacks. As discussed above, in the case of a DC-NR session, some flows of the session may be transmitted and/or received via the master gNB/radio access network (RAN) and other flows may be transmitted and/or received via the secondary gNB/RAN. When an error indication is received from the master or secondary RAN, the defined approach indicates that all flows, including flows that are not impacted by the error, are released from the RAN. This causes a service disruption for flows that are not impacted by the error. In the case of a URLLC session, only one redundant path may be impacted by the error, but, based on the defined restoration procedure, both paths may be released from the RAN. Releasing the data paths for the entire session, including flows that are not impacted by the error, may not be acceptable.

Implementations described herein allow for the handling of GTP-u errors for DC-NR, URLLC, and/or other multi-tunnel sessions with optimized signaling and minimal or no service disruption. According to implementations described herein, for DC-NR sessions, the SMF instructs the UPF to buffer downlink packets for QoS flows that are affected by the error indication while QoS flows that are not affected by the error indication are maintained. For URLLC sessions, the SMF removes the redundant downlink fully qualified tunnel endpoint identifier (F-TEID) of the tunnel affected by the error from the UPF and the UPF continues to forward downlink traffic on the tunnel that is not affected by the error.

In addition, implementations described herein allow for the SMF to trigger the AMF to transmit an N2 PDU Session Resource Modify Request to the affected RAN (instead of triggering the AMF to transmit an N2 PDU Session Resource Release Command, as would otherwise be sent per the 3GPP standards-based procedure, as noted above) with new information elements (IEs). The new IEs indicate, for each affected QoS Flow Identifier (QFI), uplink tunnel information of the affected tunnel and a cause session resource modify request (e.g., a peer tunnel error). The new IEs may allow the RAN to reestablish resources for the failed tunnel and reconfigure the user equipment (UE) for a new tunnel for transmitting and receiving data.

In addition, implementations described herein allow for the SMF to obtain new IEs contained in an N2 PDU Session Resource Modify Response sent to the AMF from the RAN in which the AMF communicates the new IEs to the SMF. The new IEs include, for each QFI, downlink tunnel information for a new gNB tunnel to transport QoS flows associated with the affected tunnel. Implementations described herein allow the SMF to request that the UPF program the DL TED for the affected flows with the downlink tunnel information associated with the new tunnel. In this way, flows affected by the tunnel error may be transmitted and received via the new tunnel.

Referring to FIG. 1, FIG. 1 is a block diagram of a system 100 in which techniques that facilitate handling GTP-u errors for multi-tunnel sessions may be implemented, according to an example embodiment. In at least one embodiment, system 100 may include a user equipment (UE) 102, a Fifth Generation (5G) Radio Access Network (RAN) 112, a core network 110, and a data network 130.

5G RAN 112 may include a master gNodeB (mgNB) 120 and a secondary gNodeB (sgNB) 122. The mgNB 120 may be referred to herein as master node, master RAN, master RAN node, and/or master gNB interchangeably. sgNB 122 may be referred to herein as secondary node, secondary RAN, secondary RAN node, and/or secondary gNB interchangeably. UE 102 may connect to mgNB 120 and/or sgNB 122 to exchange data with data network 130 via core network 110. mgNB 120 may communicate with UPF 126 in core network 110 on the N3 interface via one or more tunnels, such as tunnel 140-1. sgNB 122 may communicate with UPF 126 on the N3 interface via tunnels, such as tunnel 140-3. The number of tunnels depicted in FIG. 1 is exemplary and more or fewer tunnels may connect UPF 126 to mgNB 120 or sgNB 122.

In the case of a DC-NR PDU session, UE 102 may connect to mgNB 120 and mgNB 120 may steer some traffic to sgNB 122 via the Xn interface. For example, some QoS flows associated with the DC-NR PDU session may flow from mgNB 120 to UPF 126 via, for example, tunnel 140-1 and other QoS flows associated with the DC-NR PDU session may flow to UPF 126 via sgNB 122 and tunnel 140-3. In the case of a DC-NR session, traffic flowing from data network 130 toward UE 126 may have two downlink tunnel endpoints (e.g., a tunnel endpoint associated with mgNB 120 and a tunnel endpoint associated with sgNB 122).

In the case of a URLLC PDU session, redundant and independent N3 tunnels may be utilized for QoS flows. In other words, in a URLLC session, the same QoS flow may be transmitted over multiple tunnels in order to ensure reliable data transmission. In one implementation, a QoS flow may be transmitted over two different tunnels from a RAN node to UPF 126. For example, in this implementation, the same data may be transmitted over tunnels 140-1 and 140-2 from mgNB 120 to UPF 126. In another implementation, a QoS flow may be transmitted over a first tunnel from mgNB 120 to UPF 126 and the same data may be transmitted over a second tunnel from sgNB 122 to UPF 126. For example, the same data may be transmitted over tunnel 140-1 and tunnel 140-3. In this case, traffic flowing from data network 130 toward UE 126 may have two downlink tunnel endpoints (e.g., a tunnel endpoint associated with mgNB 120 and a tunnel endpoint associated with sgNB 122).

Generally, 5G RAN 112 may include any number of 3GPP 5G/next Generation (nG) gNodeBs or gNBs, such as mgNB 120 and sgNB 122 to facilitate network connectivity between UE 102 and core network 110. A gNB, such as mgNB 120 and sgNB 122, may implement a wireless wide area (WWA) (e.g., cellular) air interface and, in some instances also a wireless local area (e.g., Wi-Fi®) air interface, for any combination of Radio Access Technology (RAT) types (sometimes referred to more generally as 'accesses') for 5G RAN 112 such as, 3GPP WWA licensed spectrum accesses (e.g., 4G/LTE, 5G/New Radio (NR) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP licensed/unlicensed spectrum wireless local area (WLA) accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof; and/or the like. The mgNB 120 and the sgNB 122 may also include any combination of hardware (e.g., communications units, receiver(s), transmitter(s), antenna(s) and/or antenna array(s), processor(s), memory element(s), baseband processor(s) (modems), etc.)], software, logic, and/or the like that may facilitate access network connections for one or more elements of systems discussed herein, including, but not limited to, over-the-air RF communications with UE 102 for any combination of RAT type(s).

Generally, UPF 126 may support features and capabilities to facilitate user plane operation, such as packet routing and forwarding, interconnection to a data network, policy enforcement, and data buffering for 5G network connectivity. UPF 126 interfaces with data network 130 via an N6 interface and with SMF 124 via an N4 interface. SMF 124 is responsible for session management with individual functions being supported on a per session basis for 5G sessions. SMF 124 interfaces with Access and Mobility Management Function (AMF) 128 via the N11 interface and AMF 128 interfaces with sgNB 122 and mgNB 120 via N2 interfaces. Typically, an AMF, such as AMF 128, provides access authentication services, authorization services, and mobility management control functions. SMF 124 further interfaces with Policy Control Function (PCF) 122 via the N7 interface. Although not illustrated in FIG. 1, AMF 128 can also interface with PCF 122 via a 3GPP N15 interface. Typically, a PCF, such as PCF 132, provides policy rules (e.g., network slicing, roaming, mobility management, etc.) for control plane functions and supports quality of service policy and charging control functions.

UE 102 may be associated with any electronic device, machine, robot, etc. wishing to initiate a flow in systems discussed herein. The terms 'device', 'electronic device', 'UE', 'automation device', 'computing device', 'machine', 'robot', and variations thereof are inclusive of devices used to initiate a communication, such as a computer, a vehicle and/or any other transportation related device having electronic devices configured thereon, an automation device, an enterprise device, an appliance, an Internet of Things (IoT) device, etc., a personal digital assistant (PDA), a laptop or electronic notebook, a cellular telephone, a smart phone, an Internet Protocol (IP) phone, any other device and/or combination of devices, component, element, and/or object capable of initiating voice, audio, video, media, or data exchanges within system 100. UE 102 discussed herein may also be inclusive of a suitable interface to a human user such as a microphone, a display, a keyboard, or other terminal equipment. UE 102 discussed herein may also be any device that seeks to initiate a communication on behalf of another entity or element such as a program, a database, or any other component, device, element, or object capable of initiating an exchange within systems discussed herein. It is to be understood that any number of UEs may be present in systems discussed herein. UE 102 may be configured with hardware (e.g., communications units, receiver(s), transmitter(s), antenna(s) and/or antenna arrays, processor(s), memory element(s), baseband processor(s) (modems), etc.), software, logic, and/or the like (e.g., a wireless wide area network (WWAN) (e.g., cellular, 5G/nG) communications unit, a WLAN (e.g., Wi-Fi®), etc.) to facilitate over-the-air Radio Frequency (RF) connections with any combination of access networks, such as 5G RAN 112 facilitated via mgNB 120 and the sgNB 122.

Consider an operational example involving UE 102 in which UE 102 has established a PDU session with data network 130 via UPF 126 and with two downlink tunnels (e.g., tunnel 140-1 and tunnel 140-3). For example, the PDU session may be a NR-DC session, a URLLC session, or another session involving two or more downlink tunnels. In this scenario, one of the downlink endpoints (e.g., associated with tunnel 140-3) may fail (e.g., due to a gNB lost context, air interface error, etc.), and sgNB 122 may transmit a GTP-u path failure or error indication to UPF 126 on the N3 interface. In this example, the failure may impact QoS flows that are transmitted through tunnel 140-3, but QoS flows that are transmitted through tunnel 140-1 are not impacted.

When UPF 126 detects the GTP-u error indication, UPF 126 transmits an N4 Session Report Request with the IP address of sgNB 122 and a downlink TEID associated with the failed tunnel to SMF 124. As further discussed below with respect to FIGS. 2A and 2B, when the PDU session is an NR-DC session, SMF 124 may identify QoS flows associated with tunnel 140-3 and Packet Detection Rules (PDRs) corresponding to the Policy and Charging Control (PCC) rules and SMF 124 may transmit a request to UPF 126 to buffer packets for the affected PDRs. On other PDRs and corresponding QoS flows associated with other tunnels (e.g., the QoS flows transmitted over tunnel 140-1), traffic continues to flow un-interrupted.

As further discussed below with respect to FIGS. 3A and 3B, when the PDU session is a URLLC session, SMF 124 may transmit a request to UPF 126 to remove the fully qualified TEID (F-TEID) of the remote GTP-u tunnel endpoint for redundant transmission (e.g., the F-TEID corresponding to tunnel 140-3) by updating the forwarding action rule (FAR) the in downlink (DL) PDR with a null length Redundant Transmission Forwarding Parameters IE. The Redundant Transmission Forwarding Parameters IE is discussed further below with respect to FIG. 4. The flows transmitted over tunnel 140-1 continue to flow uninterrupted. In this case, the PDU session is maintained without redundant data transmission.

For either scenario, the SMF 124, using a session modification request communication, can trigger the AMF 128 to send a PDU Session Modify Request message to mgNB 120. The Session Modify Request message includes, for QoS flow affected by the failure associated with tunnel 140-3, two IEs: a cause IE indicating a peer tunnel error "<peer TNL error>" and an uplink (UL) NG-U user-plane (UP) tunnel information (UL NG-U UP TNL Info) IE that includes the UL UPF tunnel ID for which the peer GTP-u tunnel has failed "<UPF tunnel ID for which the peer GTP-u tunnel has failed>". Thus, the cause IE indicates that the request for session modification is due to a peer tunnel error and the UL NG-U UP TNL Info IE indicates an ID associated with the tunnel that has failed (e.g., tunnel 140-3).

The mgNB 120 transmits the Session Modify Request message to sgNB 122, re-establishes RAN resources for the failed tunnel 140-3 via a new tunnel (e.g., tunnel 140-4 in one example), and reconfigures UE 102 to transmit data for the QoS flows affected by the tunnel endpoint failure over the new tunnel (e.g., tunnel 140-4). In another example, if tunnel 140-1 has failed, mgNB 120 may re-establish RAN resources for the failed tunnel 140-1 via a new tunnel 140-2. mgNB 120 responds to the Session Modify Request message by transmitting a PDU Session Resource Modify Response message to AMF 128 that includes, for each QoS flow affected by the tunnel endpoint failure, a new IE-DL TNL Information <new gNB TNL Info assigned>, which includes information associated with the new tunnel (e.g., tunnel 140-4), such as the DL TEID for the new tunnel assigned to the affected QoS flows. The PDU Session Resource Modify Response message triggers SMF 124 to perform an N4 Session Modification request/response exchange with UPF 126 to trigger the UPF 126 to program the DL TEID for the affected QoS flows to be the DL TEID of the new tunnel (e.g., tunnel 140-4, in this example). After the DL TEID is programmed, the GTP-u error is restored and traffic continues to flow normally for the DC-NR or URLCC session over tunnel 140-1 and the new tunnel (e.g., tunnel 140-4, in this example).

In this way, PDU sessions with two or more downlink tunnels may be restored by transmitting information elements indicating identifiers associated with the failed tunnels and an information element associated with a new tunnel over which to transmit affected QoS flows. Implementations described herein allow a GTP-u error to be handled without service disruption to a user device and with optimized signaling.

Figure 2A:
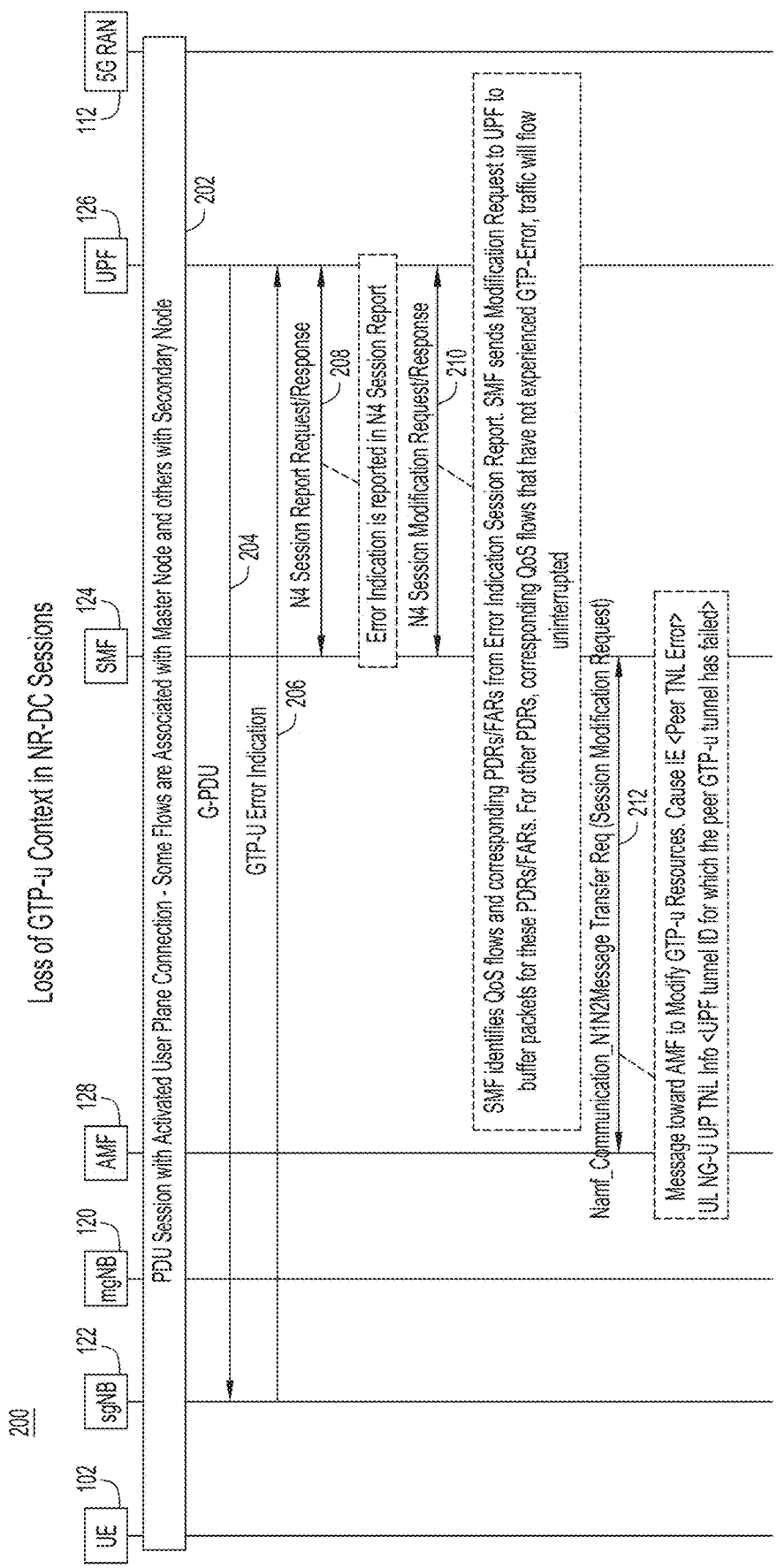
FIGS. 2A and 2B are message sequence diagrams illustrating a call flow associated with handling a loss of GTP-u context in a NR-DC session, according to an example embodiment.
Figure 2B:
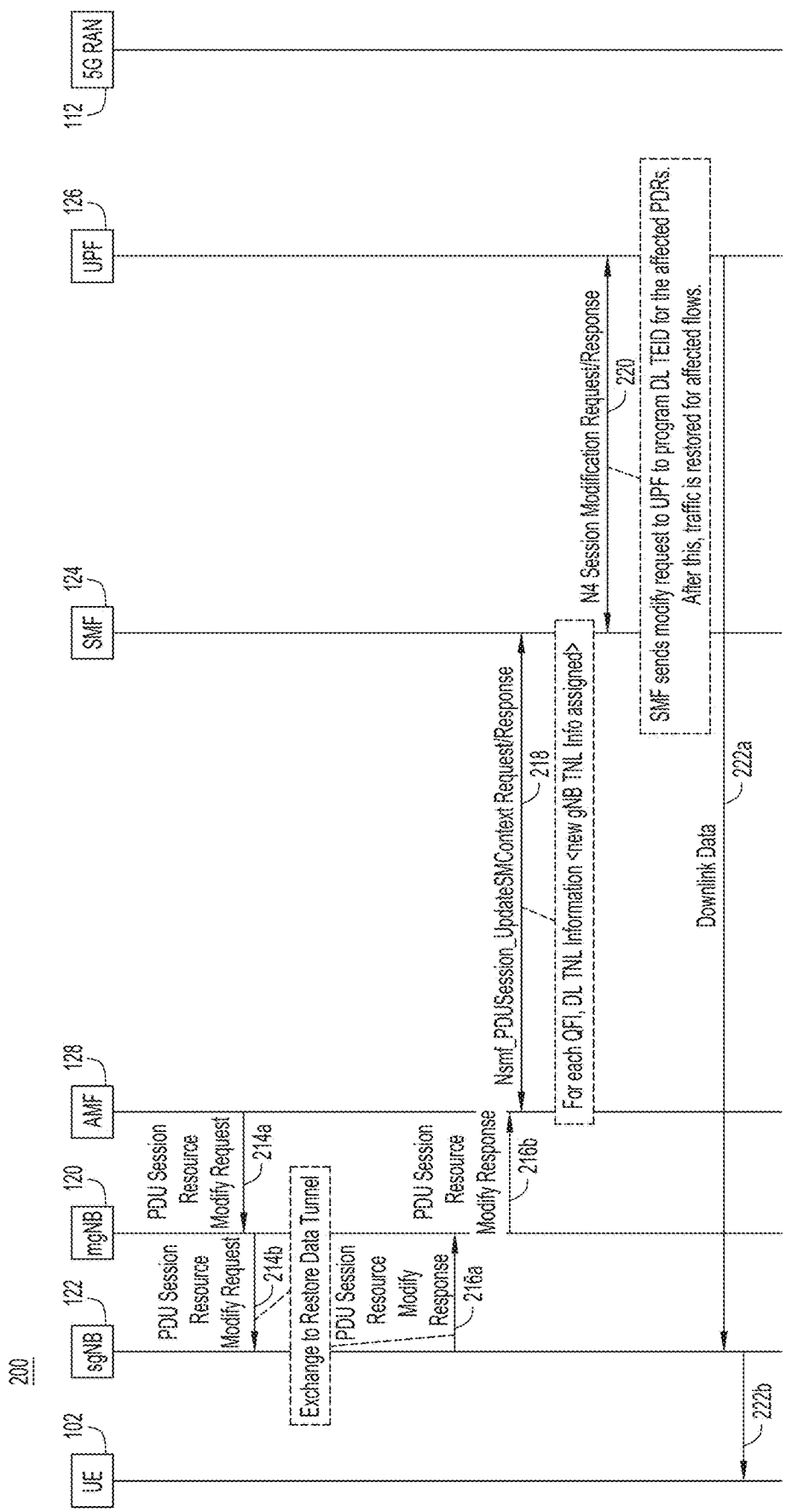

FIGS. 2A and 2B illustrate a message sequence diagram illustrating a call flow 200 that illustrates an example in which an NR-DC session is modified in response to a loss of GTP-u context. In at least one embodiment, call flow 200 illustrates example operations that may be performed, at least in part, by UE 102, sgNB 122, mgNB 120, AMF 128, SMF 124, UPF 126, and/or 5G RAN 112. Various operations for FIGS. 2A and 2B may be discussed with reference to call flow 200 and particular communications may be omitted for purposes of brevity.

At 202, a PDU session with an activated user plane connection is established between UE 102 and data network 130 (not shown in FIGS. 2A and 2B) via 5G RAN 112. In the example illustrated in FIGS. 2A and 2B, some flows of the NR-DC PDU session are associated with a master node (e.g., mgNB 120) and some flows are associated with a secondary node (e.g., sgNB 122). In addition, different QoS flows associated with the NR-DC PDU session traverse different tunnels between the master and secondary nodes and UPF 126.

At 204, UPF 126 transmits a G-PDU to sgNB 122 and, at 206, consider that sgNB 122 transmits a GTP-u Error Indication message to UPF 126. The GTP-u Error Indication may be transmitted in response to an error occurring at a downlink endpoint of a tunnel (e.g., at sgNB 122) and the GTP-u Error Indication message may indicate that the error has occurred. At 208, UPF 126 may transmit an N4 Session Report Request message to SMF 124 that includes the Error indication and SMF 124 may respond with an N4 Session Report Response message confirming receipt of the message.

The SMF 124 may identify QoS flows that are affected by the error and corresponding PDRs/FARs from the Error Indication Session Report and, at 210, SMF 124 may send an N4 Session Modification Request message to UPF 126 to request the UPF 126 to buffer packets for the PDRs/FARs affected by the error. The UPF 126 may respond with an N4 Session Modification Response message confirming buffering of the packets. For other PDRs associated with the NR-DC session that have not been affected by the error (e.g., QoS flows associated with different tunnels or different endpoints), packets will not be buffered and the traffic will flow uninterrupted.

At 212, SMF 124 performs an Namf_Communication_N1N2Message Transfer Request/Response message exchange with the AMF 128. The Namf_Communication_N1N2Message Transfer Request can include a Session Modification Request in order to request modification of GTP-u Resources for the NR-DC session. The Session Modification Request includes a Cause IE indicating that the request to modify the GTP-u Resources is due to a peer tunnel error. The Session Modification Request additionally may include an "UL NG-U UP TNL Info" IE that indicates a UPF tunnel ID for which the peer GTP-u tunnel has failed.

At 214a, AMF 128 transmits a PDU Session Resource Modify Request toward mgNB 120 with the information associated with the tunnel that has failed and at 214b, mgNB 120 forwards the PDU Session Resource Modify Request to sgNB 122 and restores the data tunnel via a new tunnel. At 216a, sgNB 122 may transmit a PDU Session Resource Modify Response message to mgNB 120 and at 216b, mgNB 120 transmits the PDU Session Resource Modify Response message to AMF 128. At 218, AMF 128 transmits an Nasmf_PDUSession_UpdateSMContext Request to SMF 124 and SMF 124 responds with an Nasmf_PDUSession_UpdateSMContext Response. The PDU Session Resource Modify Response and the Nasmf_PDUSession_UpdateSMContext Request include, for each affected QFI, a "DL TNL Information" IE with information (e.g., new DL TEID) associated with a new gNB tunnel assigned to the QoS flows that were previously associated with the failed tunnel.

At 220, SMF 124 and UPF 126 perform an N4 Session Modification Request/Response exchange in which the SMF 124 transmits an N4 Session Modification Request to UPF 126 and UPF 126 responds with an N4 Session Modification Response. The SMF 124 transmits the N4 Session Modification Request message to UPF 126 to request that UPF 126 program the DL TEID for the affected PDRs. In other words, SMF 124 requests that UPF 126 program the DL TEID of the new tunnel assigned to the affected QoS flows so traffic associated with the QoS flows may be transmitted via the new tunnel. After the DL TEID is programmed, traffic is restored for the affected flows. At 222a and 222b, traffic flows between data network 130 and UE 102 via UPF 126.

Figure 3A:
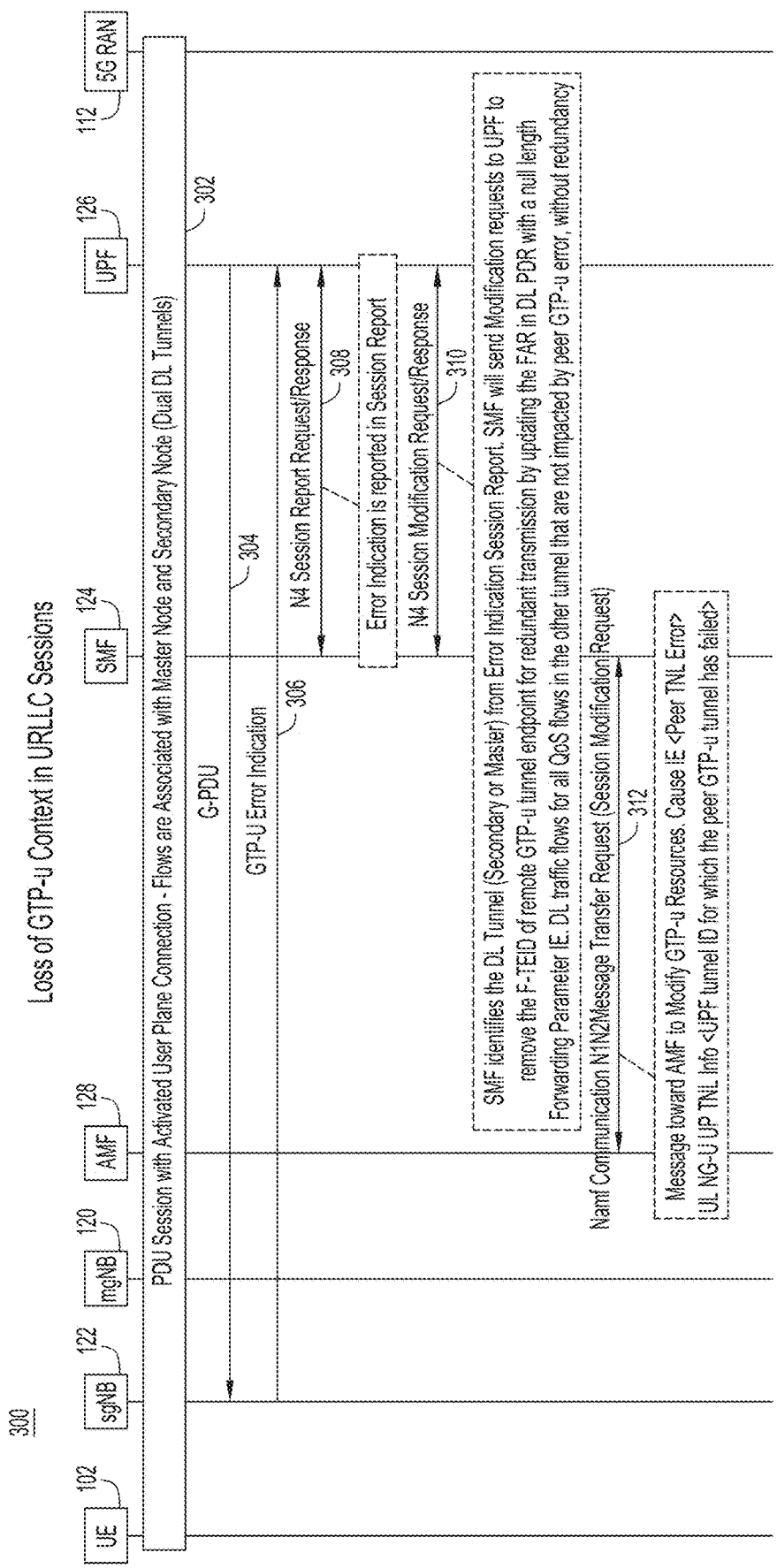
FIGS. 3A and 3B are message sequence diagram illustrating a call flow associated with handling a loss of GTP-u context in a URLLC session, according to an example embodiment.
Figure 3B:
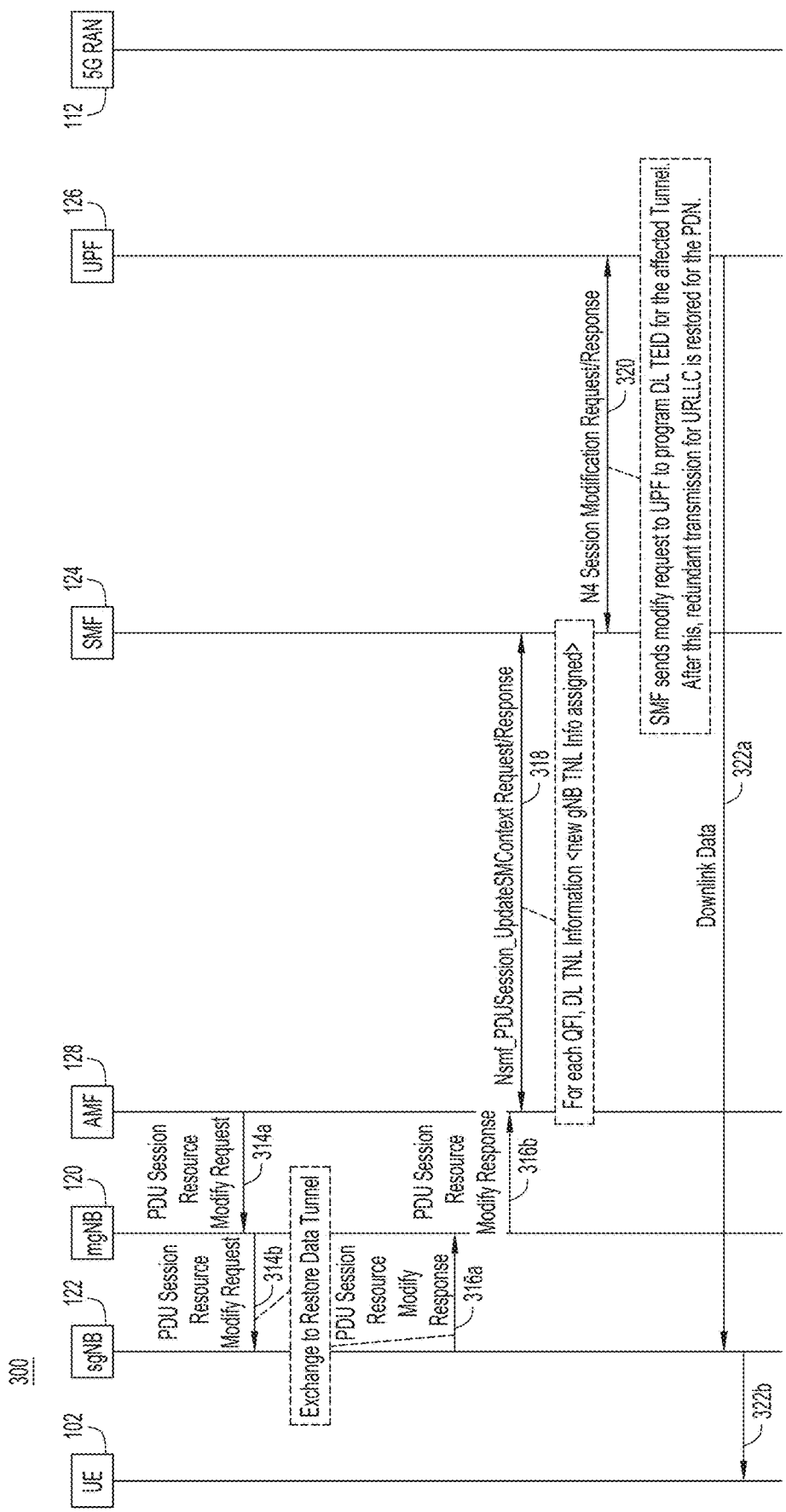

FIGS. 3A and 3B illustrate a message sequence diagram illustrating a call flow 300 that illustrates an example in which a URLLC session is modified in response to a loss of GTP-u context. In at least one embodiment, call flow 300 illustrates example operations that may be performed, at least in part, by UE 102, sgNB 122, mgNB 120, AMF 128, SMF 124, UPF 126, and/or 5G RAN 112. Various operations for FIGS. 3A and 3B may be discussed with reference to call flow 300 and particular communications may be omitted for purposes of brevity.

At 302, a PDU session with an activated user plane connection is established between UE 102 and data network 130 (not shown in FIGS. 3A and 3B) via 5G RAN 112. In the example illustrated in FIGS. 3A and 3B, redundant flows of the URLLC PDU session may be associated with a master node (e.g., mgNB 120) and a secondary node (e.g., sgNB 122).

At 304, UPF 126 transmits a G-PDU to sgNB 122 and, at 306, consider that sgNB 122 transmits a GTP-u Error Indication message to UPF 126. Similar to 206 of FIG. 2A, the GTP-u Error Indication message may be transmitted in response to an error occurring at a downlink endpoint of a tunnel (e.g., at sgNB 122) and the GTP-u Error Indication message may indicate that the error has occurred. At 308, UPF 126 may transmit an N4 Session Report Request message to SMF 124 that includes the Error indication and SMF 124 may respond with an N4 Session Report Response confirming receipt of the message, similar to 208 of FIG. 2A.

SMF 124 may identify, from the Error Indication Session Report, the downlink tunnel (e.g., secondary or master) that is affected by the error and, at 310, SMF 124 may send an N4 Session Modification Request to UPF 126 to request the UPF 126 to remove the F-TEID of the remote GTP-u tunnel endpoint of the affected tunnel for redundant transmission by updating the FAR in the DL PDR with a null length Redundant Transmission Forwarding Parameter IE. The UPF 126 may respond with an N4 Session Modification Response confirming the update. For QoS flows associated with the other tunnel(s) that are not impacted by the peer GTP-u error, downlink traffic continues to flow without interruption and without redundancy.

FIG. 4 illustrates an exemplary Redundant Transmission Forwarding Parameters IE 400 as set forth in 3GPP TS 29.244 at section 7.5.2.3. As shown at 402, octets 1 and 2 of the IE indicate that the IE is a Redundant Transmission Forwarding Parameters IE. As shown at 404, octets 3 and 4 of the IE indicate a length of the IE (length=n). As discussed above, when the PDU session is a URLLC PDU session and SMF 124 receives a Session Report indicating a GTP-u error indication, SMF 124 transmits a Session Modification Request to UPF 126 to update the FAR to indicate that Redundant Transmission Forwarding Parameter IE 400 has a null length (length=0).

As shown at 406, Redundant Transmission Forwarding Parameters IE 400 may include an Outer Header Creation IE (IE Type=Outer Header Creation). The Outer Header Creation IE is present if the user plane function is to perform the redundant transmission of the outgoing packet. If the Outer Header Creation IE is present, the Outer Header Creation IE contains the F-TEID of the remote GTP-u peer for redundant transmission.

As shown at 408, Redundant Transmission Forwarding Parameters IE 400 includes a Network Instance for Redundant Transmission IE (IE Type=Network Instance). The Network Instance for Redundant Transmission IE is included in the Redundant Transmission Forwarding Parameters IE 400 if the GTP-u tunnel used for redundant transmission uses a different network instance than the network instance used for the primary GTP-u tunnel.

Returning to FIG. 3A, at 312, SMF 124 performs an Namf_Communication_N1N2Message Transfer Request/Response message exchange with AMF 128. The Namf_Communication_N1N2Message Transfer Request can include a Session Modification Request in order to request modification of GTP-u Resources for the URLLC session. Similar to 212 of FIG. 2A, the Session Modification Request includes a Cause IE indicating that the request to modify the GTP-u Resources is due to a peer tunnel error. The Session Modification Request additionally may include an "UL NG-U UP TNL Info" IE that indicates a UPF tunnel ID for which the peer GTP-u tunnel has failed.

At 314a, AMF 128 transmits a PDU Session Resource Modify Request message to mgNB 120 with the information associated with the tunnel that has failed and at 314b, mgNB 120 transmits the PDU Session Resource Modify Request to sgNB 122 and restores the data tunnel. At 316a, sgNB 122 may transmit a PDU Session Resource Modify Response to mgNB 120 and, at 316b, mgNB 120 may forward the PDU Session Resource Modify Response to AMF 128. At 318, AMF 128 transmits an Nasmf_PDUSession_UpdateSMContext Request to SMF 124 and SMF 124 responds with an Nasmf_PDUSession_UpdateSMContext Response. The Nasmf_PDUSession_UpdateSMContext Request includes, for each affected QFI, a "DL TNL Information" IE with information (e.g., new DL TEID) associated with a new redundant gNB tunnel for transmitting data associated with the URLLC PDU session.

At 320, SMF 124 and UPF 126 perform an N4 Session Modification Request/Response exchange in which SMF 124 transmits an N4 Session Modification Request to UPF 126 and UPF 126 responds with an N4 Session Modification Response. The SMF 124 transmits the N4 Session Modification Request message to UPF 126 to request that UPF 126 program the DL TEID for the affected PDRs. In other words, SMF 124 requests that UPF 126 program the DL TEID of the new redundant tunnel. After the DL TED is programmed, redundant transmission for the URLLC session is restored for the packet data network. At 322a and 322b, traffic flows between data network 130 and UE 102 via UPF 126.

Referring to FIG. 5, FIG. 5 is a flow chart depicting a method 500 according to an example embodiment. In particular, method 500 illustrates example operations that may be performed, at least in part, by an SMF, such as SMF 124, in order to restore traffic for QoS flows affected by a tunnel endpoint failure, as discussed for various techniques presented herein.

At 510, an indication that an error has occurred at an endpoint of a first tunnel of a data session having a plurality of flows may be obtained. The flows may be associated with a first tunnel and a second tunnel. For example, the data session may be a DC-NR session and some flows may be associated with a tunnel at a master node (e.g., tunnel 140-1 at mgNB 120) and some flows may be associated with a secondary node (e.g., tunnel 140-3 at sgNB 122). As another example, the data session may be a redundant path URLLC path and some flows may be associated with two tunnels with different endpoints (e.g., tunnel 140-1 at mgNB 120 and tunnel 140-2 at sgNB 122). SMF 124 may obtain an indication that an error has occurred at an endpoint of a tunnel of the data session such that one or more flows may not be transmitted via the tunnel.

At 520, a request may be transmitted to an AMF to modify resources for a first flow or a first plurality of flows associated with the first tunnel. For example, SMF 124 may transmit a resource modify request to AMF 128 to modify the resources for the first flow or first plurality of flows. The request may include an information element indicating that the resources are being modified due to a peer tunnel error. The request may additionally include an information element including a UPF tunnel ID for the peer tunnel that has failed.

At 530, SMF 124 may obtain a response that includes an indication of a new tunnel assigned to the first flow or the first plurality of flows. For example, the response may include, for each QFI of the flow, a downlink tunnel information IE that indicates a new gNB tunnel information assigned to the QFI.

At 540, SMF 124 may transmit a request (e.g., an N4 Session Modification Request) to a UPF including an identifier associated with the new tunnel for the first flow/first plurality of flows to facilitate transmitting data associated with the first flow/first plurality of flows over the new tunnel. For example, SMF 124 may send a session modification request to UPF 126 to program the DL TEID for the flows affected by the tunnel failure with the DL TEID of the new tunnel. When the DL TEID is programmed, traffic may flow over the new tunnel. If the session is a URLLC session, redundant transmission may be restored for the flows. The second tunnel is maintained so that data of flows associated with the second tunnel are transmitted over the second tunnel.

Figure 6:
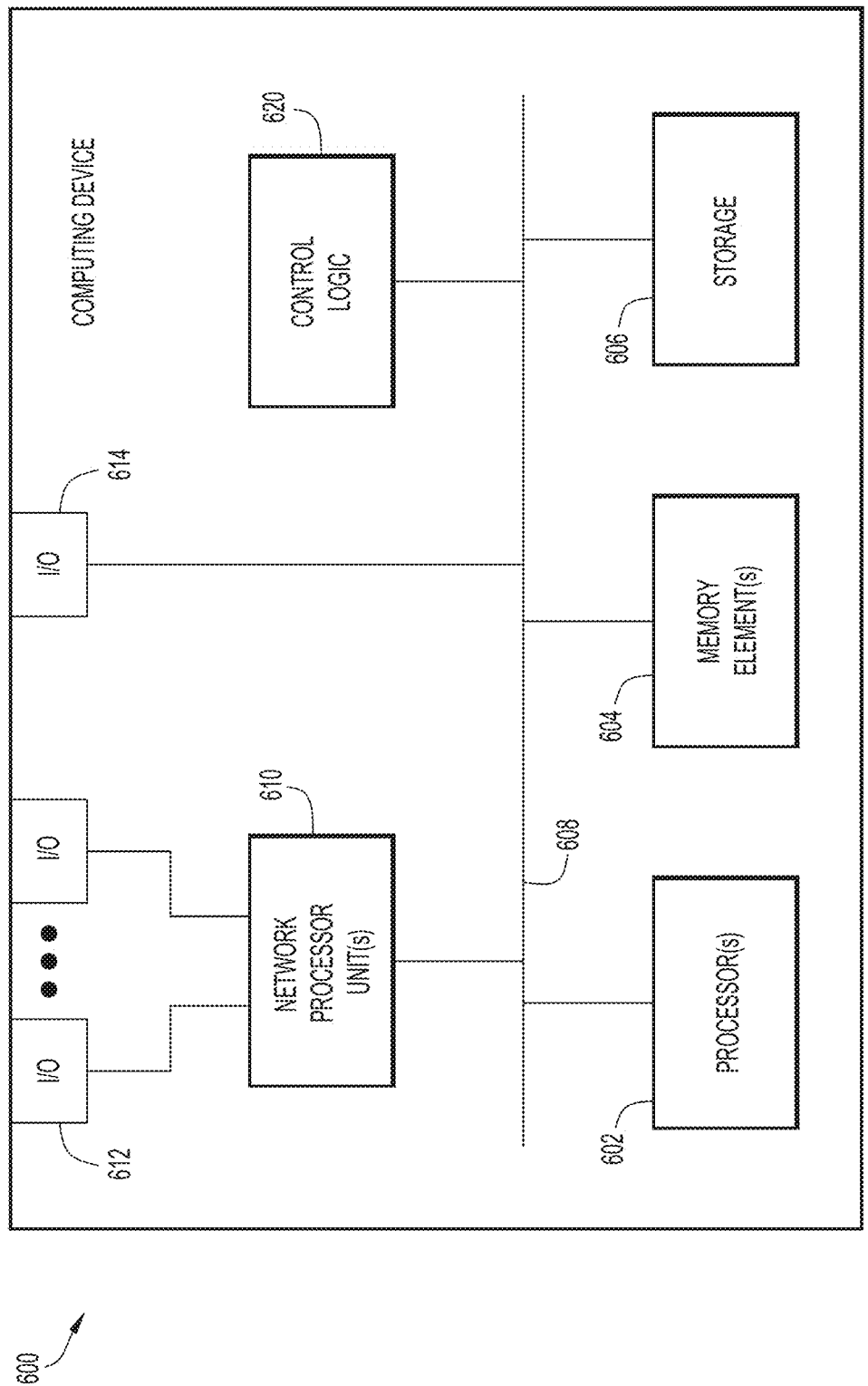
FIG. 6 is a hardware block diagram of a computing device that may perform functions associated with any combination of operations, in connection with the techniques discussed herein.

Referring to FIG. 6, FIG. 6 illustrates a hardware block diagram of a computing device 600 that may perform functions associated with operations discussed herein in connection with the techniques depicted in FIGS. 1, 2A, 2B, 3A, 3B, and 5. In various embodiments, a computing device, such as computing device 600 or any combination of computing devices 600, may be configured as any elements/devices/nodes as discussed for the techniques depicted in connection with FIGS. 1, 2A, 2B, 3A, 3B, and 5, UPF 126, AMF 128, SMF 124, PCF 132, UE 102, etc. as shown in FIG. 1.

It should be appreciated that FIG. 6 provides only an illustration of one embodiment and does not imply any limitations with regard to the environments in which different embodiments may be implemented. Many modifications to the depicted environment may be made.

In at least one embodiment, computing device 600 may be any apparatus that may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device. Processor(s) 602 (e.g., hardware processor(s)) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communications (e.g., wired and/or wireless communications) between computing device 600 and other systems, entities, etc., via network I/O interface(s) 612 to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, and/or any other I/O port(s) and/or antennas/antenna arrays now known or hereafter developed. Thus, the network processor unit(s) 610 and/or network I/O interface(s) 612 may include any suitable interfaces for receiving, transmitting, and/or otherwise communicating (in a wired and/or wireless manner) data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

For example, in at least one implementation in which computing device 600 is implemented as the SMF 124 of FIGS. 1, 2A, 2B, 3A, 3B, and 5, control logic 620 can include instructions that, when executed, cause processor(s) 602 to perform operations including obtaining an indication that an error has occurred at an endpoint of a first tunnel of the data session for the user equipment, the data session having a plurality of flows associated with the first tunnel and a second tunnel; transmitting, to an AMF, a request to modify resources for a first flow associated with the first tunnel; obtaining, from the AMF, a response including an indication of a new tunnel assigned to the first flow; and transmitting a request to a UPF including an identifier associated with the new tunnel for the first flow to facilitate transmitting data associated with the first flow over the new tunnel.

Figure 7:
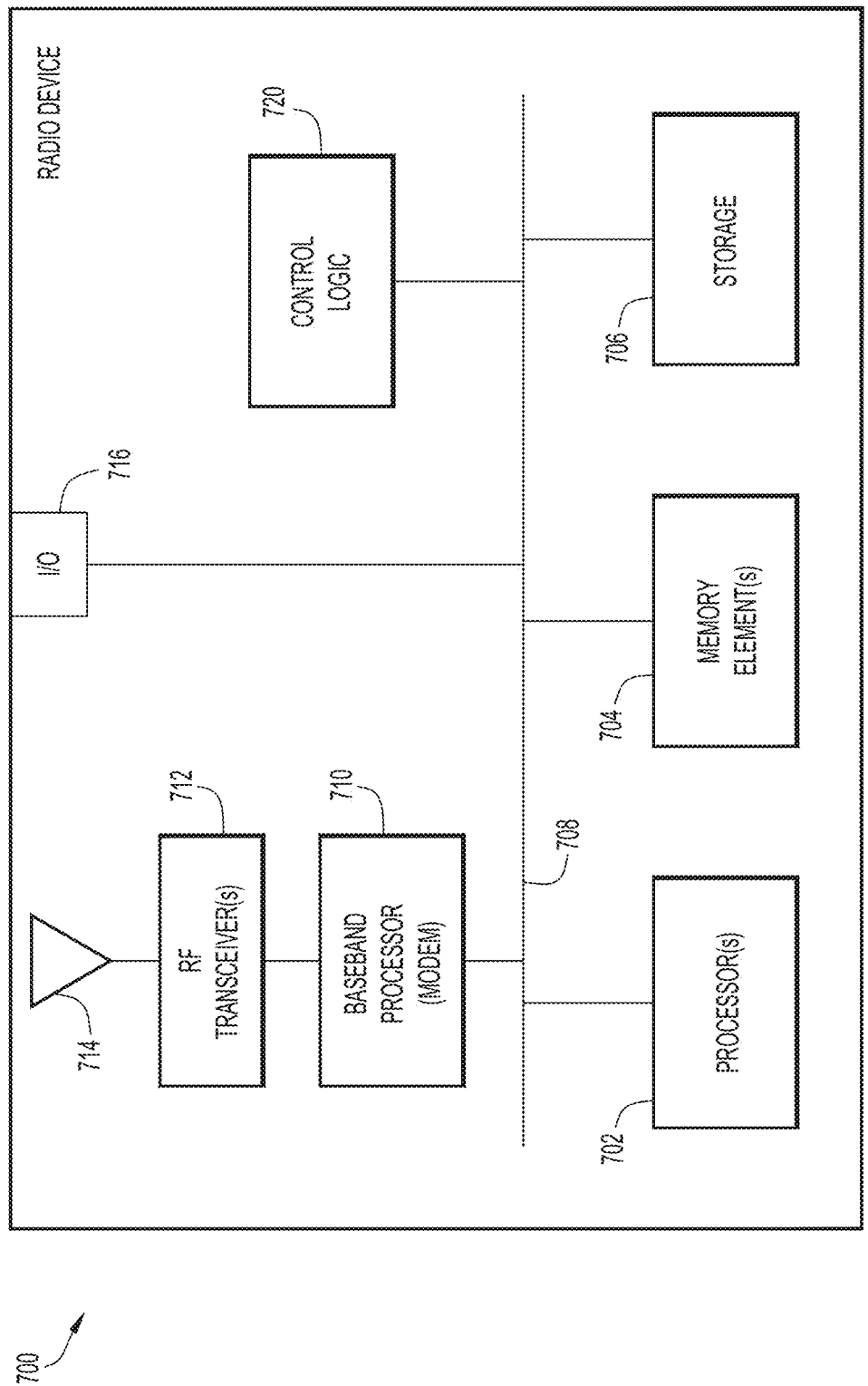
FIG. 7 is a hardware block diagram of a radio device that may perform functions associated with any combination of operations, in connection with the techniques discussed herein.

Referring to FIG. 7, FIG. 7 illustrates a hardware block diagram of a radio device 700 that may perform functions associated with operations discussed herein. In various embodiments, a user equipment or apparatus, such as radio device 700 or any combination of radio device 700, may be configured as any radio node/nodes as depicted herein in order to perform operations of the various techniques discussed herein, such as operations that may be performed by any of a user device, such as UE 102, mgNB 120, and/or sgNB 122.

In at least one embodiment, radio device 700 may be any apparatus that may include one or more processor(s) 702, one or more memory element(s) 704, storage 706, a bus 708, a baseband processor or modem 710, one or more radio RF transceiver(s) 712, one or more antennas or antenna arrays 714, one or more I/O interface(s) 716, and control logic 720.

The one or more processor(s) 702, one or more memory element(s) 704, storage 706, bus 708, and I/O interface(s) 716 may be configured/implemented in any manner described herein, such as described herein at least with reference to FIG. 7.

The RF transceiver(s) 712 may perform RF transmission and RF reception of wireless signals via antenna(s)/antenna array(s) 714, and the baseband processor (modem) 710 performs baseband modulation and demodulation, etc. associated with such signals to enable wireless communications for radio device 700.

In various embodiments, control logic 720, can include instructions that, when executed, cause processor(s) 702 to perform operations, which can include, but not be limited to, providing overall control operations of radio device 700; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620/720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604/704 and/or storage 606/706 can store data, software, code, instructions (e.g., processor instructions), logic, parameters, combinations thereof, and/or the like used for operations described herein. This includes memory element(s) 604/704 and/or storage 606/706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a method is provided that may include obtaining, by a session management node associated with a data session of a user equipment, an indication that an error has occurred at an endpoint of a first tunnel of the data session for the user equipment, the data session having a plurality of flows associated with the first tunnel and a second tunnel; transmitting, to an access and mobility management function (AMF), a request to modify resources for a first plurality of flows associated with the first tunnel; obtaining, from the AMF, a response including an indication of a new tunnel assigned to the first plurality of flows; and transmitting a request to a user plane function (UPF) including an identifier associated with the new tunnel for the first plurality of flows to facilitate transmitting data associated with the first plurality of flows over the new tunnel, wherein the second tunnel is maintained so that data of flows associated with the second tunnel are transmitted over the second tunnel.

In one example, obtaining the indication includes obtaining a session report including an address of the endpoint and a tunnel endpoint identifier (TEID) associated with the first tunnel. In another example, the data session is a new radio dual connectivity (NR-DC) session and the method further comprises transmitting a modification request to the UPF to buffer packets for the first plurality of flows. In another example, the data session is an ultra-reliable low latency communication (URLLC) session and the method further comprises transmitting a modification request to the UPF to remove a fully qualified TEID (F-TEID) of the endpoint for redundant transmission by updating a forwarding action rule (FAR) in a downlink packet detection rule (PDR) associated with the URLLC session with a null length Redundant Transmission Forwarding Parameters information element.

In another example, the request to modify resources for the first plurality of flows associated with the first tunnel includes a first information element (IE) indicating a cause of the error and a second IE including an identifier associated with the first tunnel. In another example, the response including the indication of the new tunnel assigned to the first plurality of flows includes a tunnel endpoint identifier (TEID) for the new tunnel. In another example, the endpoint is a master gNodeB (gNB) or a secondary gNB.

In another form, a system is provided that includes at least one memory element for storing data; and at least one processor for executing instructions associated with the data, wherein executing the instructions causes the system to perform operations, comprising: obtaining, by a session management node associated with a data session of a user equipment, an indication that an error has occurred at an endpoint of a first tunnel of the data session for the user equipment, the data session having a plurality of flows associated with the first tunnel and a second tunnel; transmitting, to an access and mobility management function (AMF), a request to modify resources for a first plurality of flows associated with the first tunnel; obtaining, from the AMF, a response including an indication of a new tunnel assigned to the first plurality of flows; and transmitting a request to a user plane function (UPF) including an identifier associated with the new tunnel for the first plurality of flows to facilitate transmitting data associated with the first plurality of flows over the new tunnel, wherein the second tunnel is maintained so that data of flows associated with the second tunnel are transmitted over the second tunnel.

In still another form, one or more non-transitory computer-readable storage media encoded with instructions are provided that, when executed by a processor, cause the processor to perform operations, comprising: obtaining, by a session management node associated with a data session of a user equipment, an indication that an error has occurred at an endpoint of a first tunnel of the data session for the user equipment, the data session having a plurality of flows associated with the first tunnel and a second tunnel; transmitting, to an access and mobility management function (AMF), a request to modify resources for a first plurality of flows associated with the first tunnel; obtaining, from the AMF, a response including an indication of a new tunnel assigned to the first plurality of flows; and transmitting a request to a user plane function (UPF) including an identifier associated with the new tunnel for the first plurality of flows to facilitate transmitting data associated with the first plurality of flows over the new tunnel, wherein the second tunnel is maintained so that data of flows associated with the second tunnel are transmitted over the second tunnel.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi 6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items.

For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
obtaining, by a session management node associated with a data session of a user equipment, an indication that an error has occurred at an endpoint of a first tunnel of the data session for the user equipment, the data session having a plurality of flows associated with the first tunnel and a second tunnel;
transmitting, to an access and mobility management function (AMF), a request to modify resources for a first plurality of flows associated with the first tunnel;
obtaining, from the AMF, a response including an indication of a new tunnel assigned to the first plurality of flows; and
transmitting a request to a user plane function (UPF) including an identifier associated with the new tunnel for the first plurality of flows to facilitate transmitting data associated with the first plurality of flows over the new tunnel, wherein the second tunnel is maintained so that data of flows associated with the second tunnel are transmitted over the second tunnel.

2. The method of claim 1, wherein obtaining the indication that the error has occurred at the endpoint of the first tunnel of the data session for the user equipment includes obtaining a session report including an address of the endpoint and a tunnel endpoint identifier (TEID) associated with the first tunnel.

3. The method of claim 1, wherein the data session is a new radio dual connectivity (NR-DC) session, the method further comprising:
transmitting a modification request to the UPF to buffer packets for the first plurality of flows.

4. The method of claim 1, wherein the data session is an ultra-reliable low latency communication (URLLC) session, the method further comprising:
transmitting a modification request to the UPF to remove a fully qualified tunnel endpoint identifier (F-TEID) of the endpoint of the first tunnel for redundant transmission by updating a forwarding action rule (FAR) in a downlink packet detection rule (PDR) associated with the URLLC session with a null length Redundant Transmission Forwarding Parameters information element.

5. The method of claim 1, wherein the request to modify resources for the first plurality of flows associated with the first tunnel includes a first information element (IE) indicating the error and a second IE including an identifier associated with the first tunnel.

6. The method of claim 1, wherein the response including the indication of the new tunnel assigned to the first plurality of flows includes a tunnel endpoint identifier (TEID) for the new tunnel.

7. The method of claim 1, wherein the endpoint is a master gNodeB (gNB) or a secondary gNB.

8. A system comprising:
at least one memory element for storing data; and
at least one processor for executing instructions associated with the data, wherein executing the instructions causes the system to perform operations, comprising:
obtaining, by a session management node associated with a data session of a user equipment, an indication that an error has occurred at an endpoint of a first tunnel of the data session for the user equipment, the data session having a plurality of flows associated with the first tunnel and a second tunnel;
transmitting, to an access and mobility management function (AMF), a request to modify resources for a first plurality of flows associated with the first tunnel;
obtaining, from the AMF, a response including an indication of a new tunnel assigned to the first plurality of flows; and
transmitting a request to a user plane function (UPF) including an identifier associated with the new tunnel for the first plurality of flows to facilitate transmitting data associated with the first plurality of flows over the new tunnel, wherein the second tunnel is maintained so that data of flows associated with the second tunnel are transmitted over the second tunnel.

9. The system of claim 8, wherein obtaining the indication that the error has occurred at the endpoint of the first tunnel of the data session for the user equipment includes obtaining a session report including an address of the endpoint and a tunnel endpoint identifier (TEID) associated with the first tunnel.

10. The system of claim 8, wherein the data session is a new radio dual connectivity (NR-DC) session, and wherein executing the instructions causes the system to perform further operations comprising:
transmitting a modification request to the UPF to buffer packets for the first plurality of flows.

11. The system of claim 8, wherein the data session is an ultra-reliable low latency communication (URLLC) session, and wherein executing the instructions causes the system to perform further operations comprising:
transmitting a modification request to the UPF to remove a fully qualified TED (F-TEID) of the endpoint of the first tunnel for redundant transmission by updating a forwarding action rule (FAR) in a downlink packet detection rule (PDR) associated with the URLLC session with a null length Redundant Transmission Forwarding Parameters information element.

12. The system of claim 8, wherein the request to modify resources for the first plurality of flows associated with the first tunnel includes a first information element (IE) identifying the error and a second IE including an identifier associated with the first tunnel.

13. The system of claim 8, wherein the response including the indication of the new tunnel assigned to the first plurality of flows includes a tunnel endpoint identifier (TEID) for the new tunnel.

14. The system of claim 8, wherein the endpoint is a master gNodeB (gNB) or a secondary gNB.

15. One or more non-transitory computer-readable storage media encoded with instructions that, when executed by a processor, cause the processor to perform operations, comprising:
   obtaining, by a session management node associated with a data session of a user equipment, an indication that an error has occurred at an endpoint of a first tunnel of the data session for the user equipment, the data session having a plurality of flows associated with the first tunnel and a second tunnel;
   transmitting, to an access and mobility management function (AMF), a request to modify resources for a first plurality of flows associated with the first tunnel;
   obtaining, from the AMF, a response including an indication of a new tunnel assigned to the first plurality of flows; and
   transmitting a request to a user plane function (UPF) including an identifier associated with the new tunnel for the first plurality of flows to facilitate transmitting data associated with the first plurality of flows over the new tunnel, wherein the second tunnel is maintained so that data of flows associated with the second tunnel are transmitted over the second tunnel.

16. The one or more non-transitory computer-readable storage media of claim 15, wherein obtaining the indication that the error has occurred at the endpoint of the first tunnel of the data session for the user equipment includes obtaining a session report including an address of the endpoint and a tunnel endpoint identifier (TEID) associated with the first tunnel.

17. The one or more non-transitory computer-readable storage media of claim 15, wherein the data session is a new radio dual connectivity (NR-DC) session and wherein the instructions cause the processor to perform further operations comprising:
   transmitting a modification request to the UPF to buffer packets for the first plurality of flows.

18. The one or more non-transitory computer-readable storage media of claim 15, wherein the data session is an ultra-reliable low latency communication (URLLC) session and wherein the instructions cause the processor to perform further operations comprising:
   transmitting a modification request to the UPF to remove a fully qualified TED (F-TEID) of the endpoint of the first tunnel for redundant transmission by updating a forwarding action rule (FAR) in a downlink packet detection rule (PDR) associated with the URLLC session with a null length Redundant Transmission Forwarding Parameters information element.

19. The one or more non-transitory computer-readable storage media of claim 15, wherein the request to modify resources for the first plurality of flows associated with the first tunnel includes a first information element (IE) indicating a cause of the error and a second IE including an identifier associated with the first tunnel.

20. The one or more non-transitory computer-readable storage media of claim 15, wherein the endpoint is a master gNodeB (gNB) or a secondary gNB.

* * * * *

UNITED STATES PATENT AND TRADEMARK OFFICE
CERTIFICATE OF CORRECTION

PATENT NO. : 11,800,578 B2
APPLICATION NO. : 17/512851
DATED : October 24, 2023
INVENTOR(S) : Ravi Sankar Mantha et al.

It is certified that error appears in the above-identified patent and that said Letters Patent is hereby corrected as shown below:

In the Claims

Claim 11, Column 18, Line 59, please replace "a fully qualified TED (F-TEID) of the endpoint of the" with --a fully qualified TEID (F-TEID) of the endpoint of the--

Claim 18, Column 20, Line 18, please replace "a fully qualified TED (F-TEID) of the endpoint of the" with --a fully qualified TEID (F-TEID) of the endpoint of the--

Signed and Sealed this
Second Day of January, 2024

Katherine Kelly Vidal
*Director of the United States Patent and Trademark Office*